United States Patent
Solanki et al.

(10) Patent No.: US 12,432,184 B2
(45) Date of Patent: Sep. 30, 2025

(54) FLOW-BASED SECURE PACKET FORWARDING

(71) Applicant: VMware LLC, Palo Alto, CA (US)

(72) Inventors: Deepika Kunal Solanki, Pune (IN); Indresh Mishra, Pune (IN)

(73) Assignee: VMware LLC, Palo Alto, CA (US)

( * ) Notice: Subject to any disclaimer, the term of this patent is extended or adjusted under 35 U.S.C. 154(b) by 542 days.

(21) Appl. No.: 17/734,123

(22) Filed: May 2, 2022

(65) Prior Publication Data
US 2023/0353543 A1 Nov. 2, 2023

(51) Int. Cl.
*H04L 9/40* (2022.01)

(52) U.S. Cl.
CPC ...... *H04L 63/0428* (2013.01); *H04L 63/0807* (2013.01); *H04L 63/205* (2013.01)

(58) Field of Classification Search
CPC .............. H04L 63/0428; H04L 63/0807; H04L 63/205
See application file for complete search history.

(56) References Cited

U.S. PATENT DOCUMENTS

| | | | |
|---|---|---|---|
| 8,533,343 B1 * | 9/2013 | Beda, III | G06F 9/546 709/227 |
| 9,135,037 B1 * | 9/2015 | Petrescu-Prahova | G06F 9/45558 |
| 9,258,271 B1 * | 2/2016 | Anderson | H04L 49/3009 |
| 9,491,098 B1 | 11/2016 | Wilson et al. | |
| 9,509,616 B1 | 11/2016 | Judge et al. | |
| 9,542,546 B2 | 1/2017 | Wallis et al. | |
| 9,619,662 B1 * | 4/2017 | Beda, III | G06F 21/606 |
| 9,973,547 B1 * | 5/2018 | Simms | H04L 47/22 |
| 10,104,039 B1 * | 10/2018 | Knecht | H04L 61/2592 |
| 2005/0198197 A1 | 9/2005 | Yoshiuchi et al. | |

(Continued)

FOREIGN PATENT DOCUMENTS

| | | | | |
|---|---|---|---|---|
| KR | 20210085609 A | * | 7/2021 | ......... H04L 67/1001 |
| WO | WO-2022212193 A1 | * | 10/2022 | ............. G06F 21/53 |

OTHER PUBLICATIONS

Sirull, M. (Nov. 25, 2019). Introducing secure tunneling for AWS IOT Device Management, a new secure way to troubleshoot IOT devices. https://aws.amazon.com/blogs/iot/introducing-secure-tunneling-for-aws-iot-device-management-a-new-secure-way-to-troubleshoot-iot-devices/ (Year: 2019).*

*Primary Examiner* — Michael R Vaughan
(74) *Attorney, Agent, or Firm* — King Intellectual Asset Management

(57) ABSTRACT

Example methods and systems for flow-based secure packet forwarding are described. In one example, a first computer system may assess validity of a security token associated with a flow of one or more packets. In response to determination that the security token is valid, a security association associated with the flow and the security token may be negotiated with a second computer system. The first computer system may process a packet associated with the flow and the security token to generate an encapsulated encrypted packet by performing encryption and encapsulation based on the security association. The encapsulated encrypted packet may be forwarded towards the second computer system to cause the second computer system to perform decapsulation and decryption, and to forward a decapsulated and decrypted packet towards the destination.

21 Claims, 8 Drawing Sheets

(56) References Cited

U.S. PATENT DOCUMENTS

| | | |
|---|---|---|
| 2006/0098663 A1 | 5/2006 | Shore |
| 2009/0241170 A1 | 9/2009 | Kumar et al. |
| 2012/0060029 A1* | 3/2012 | Fluhrer ............... H04L 63/0428 |
| | | 713/160 |
| 2014/0003434 A1 | 1/2014 | Assarpour et al. |
| 2014/0032975 A1 | 1/2014 | Chandran et al. |
| 2017/0064749 A1 | 3/2017 | Jain et al. |
| 2017/0244713 A1* | 8/2017 | Sun ....................... G06F 21/125 |
| 2019/0334880 A1* | 10/2019 | Wang .................. H04L 63/0471 |
| 2021/0036890 A1 | 2/2021 | Mishra |
| 2022/0103517 A1* | 3/2022 | Luotojärvi .......... H04L 63/0876 |
| 2022/0417215 A1* | 12/2022 | Parthasarathi .......... H04L 63/04 |

* cited by examiner

FLOW-BASED SECURE PACKET FORWARDING

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, packet communication among VMs is susceptible to security attacks by malicious third parties. It is therefore desirable to implement packet forwarding in a more secure manner in the SDN environment.

DETAILED DESCRIPTION

According to examples of the present disclosure, flow-based secure packet forwarding may be implemented to improve network security. One example may involve a first computer system (e.g., EDGE1 150 in FIG. 1) assessing validity of a security token (e.g., T1 in FIG. 1) associated with a flow of packet(s). The flow (e.g., FLOW1 in FIG. 1) may be destined for a destination that is reachable from the first computer system via a second computer system (e.g., EDGE2 160 in FIG. 1). In response to determination that the security token is valid, a security association (SA) associated with the flow and the security token may be negotiated with the second computer system.

Figure 1:
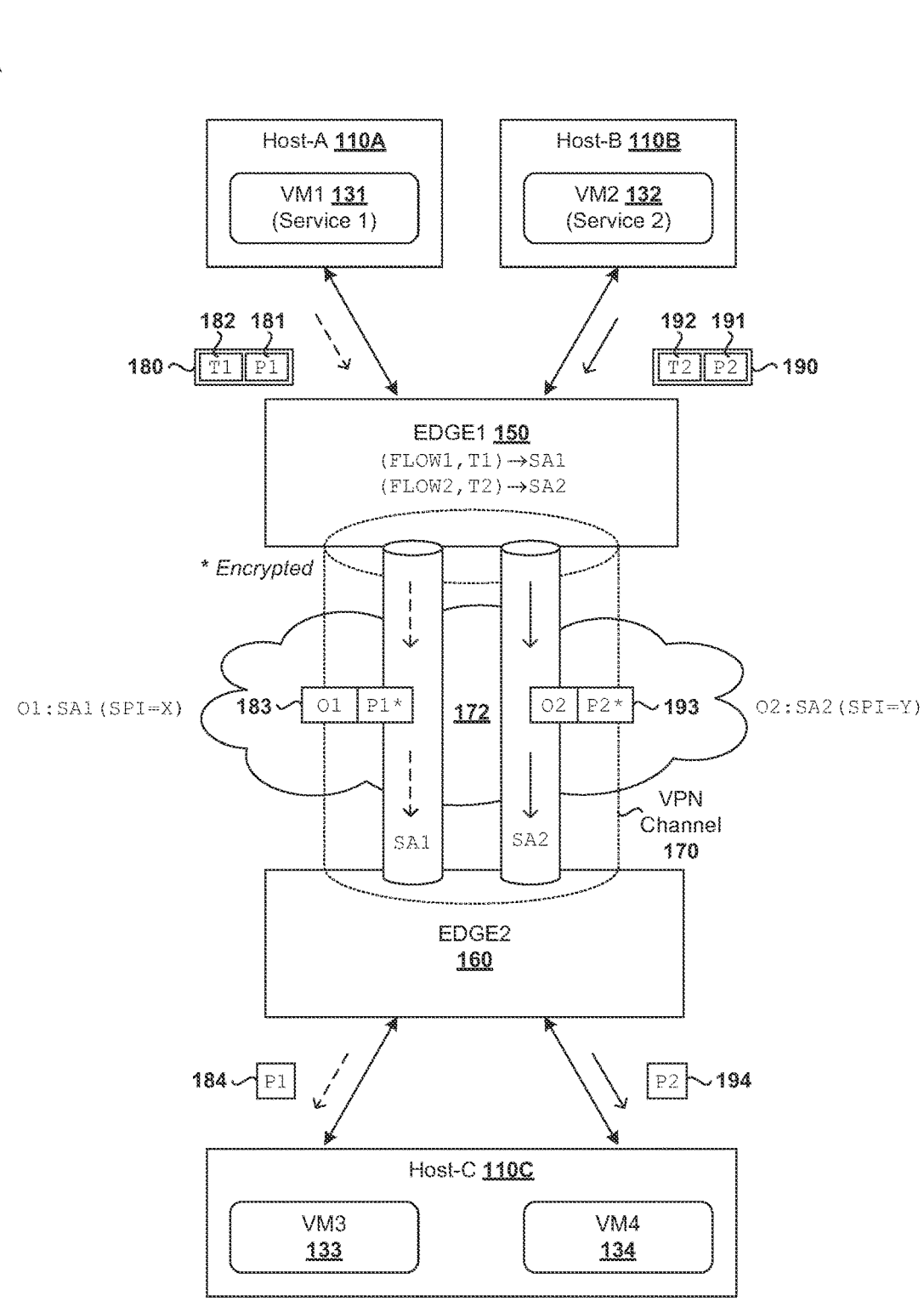
FIG. 1 is a schematic diagram illustrating an example software-defined networking (SDN) environment in which flow-based secure packet forwarding may be performed.

Once the SA is negotiated, the first computer system may process a packet associated with the flow and the security token to generate an encapsulated encrypted packet by performing encryption and encapsulation based on the SA (see 180-183 in FIG. 1). This way, the encapsulated encrypted packet may be forwarded towards the second computer system to cause the second computer system to perform decapsulation and decryption, and to forward a decapsulated and decrypted packet towards the destination (see 184 in FIG. 1). Examples of the present disclosure may be implemented to facilitate secure forwarding of trusted (e.g., authenticated and/or authorized) traffic flows associated with respective valid security tokens. Various examples will be discussed below.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

Figure 2:
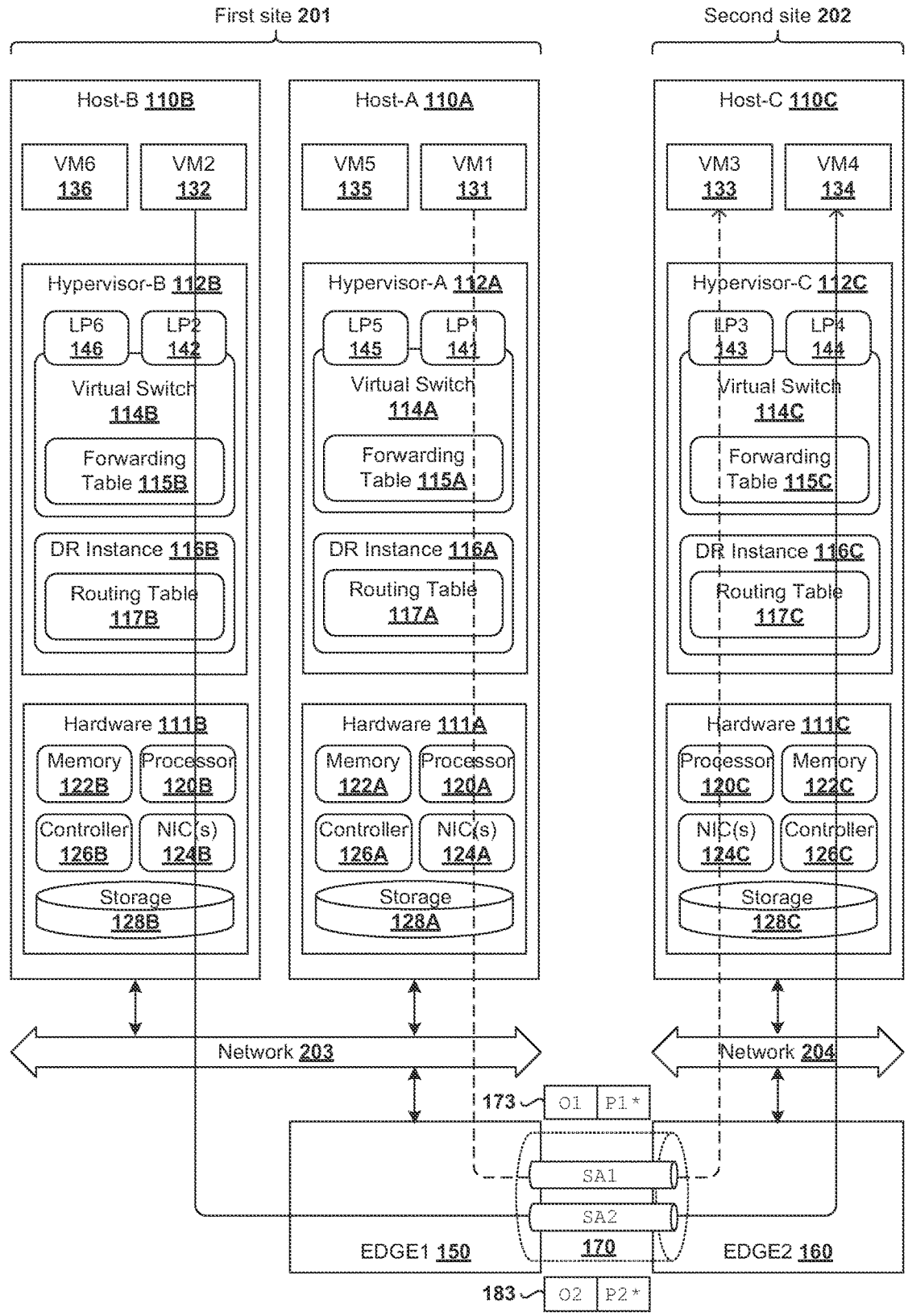
FIG. 2 is a schematic diagram illustrating an example physical view of hosts in an SDN environment.

FIG. 1 is a schematic diagram illustrating example software-defined networking (SDN) environment 100 in which flow-based secure packet forwarding may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A, host-B 110B and host-C 110C. In practice, hosts 110A-C may be located at geographically dispersed sites, such hosts 110A-B at a first site and hosts 110C-D at a second site. To facilitate communication among hosts 110A-D over physical network 172, EDGE1 150 may be deployed at the edge of the first site, and EDGE2 160 at the edge of the second site.

Referring also to FIG. 2, EDGE1 150 ("first computer system") and EDGE2 160 ("second computer system") may be any suitable entities that are each implemented using one or more virtual machines (VMs) and/or physical machines (also known as "bare metal machines"). Depending on the desired implementation, EDGE 150/160 may be configured to perform functionalities of a switch, router, bridge, gateway, edge appliance, or any combination thereof. For example, EDGE 150/160 may implement a centralized service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, each EDGE 150/160 may be considered to be an exit point to an external network.

Hosts 110A-C may each include suitable hardware and virtualization software (e.g., hypervisors 112A-C) to support various VMs 131-136. At first site 201, hosts 110A-B may be connected with EDGE1 150 via any suitable physical network 203. At second site 202, host-C 110C may be connected with EDGE2 160 via physical network 204. As such, a VM at first site 201 (e.g., VM1 131) may communicate with another VM (e.g., VM3 133) at second site 202 via EDGE1 150 and EDGE2 160. For each host 110A/110B/110C, hypervisor 112A/112B/112C maintains a mapping between underlying hardware 111A/111B/111C and virtual resources allocated to the VMs.

Hardware 111A/111B/111C includes various physical components, such as central processor(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processor (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

VMs 131-136 may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Depending on the desired implementation, tunnel 170 may be established between EDGE1 150 and EDGE2 160. Note that EDGE1 150 may establish a tunnel with any other endpoint or non-edge router, not just EDGE2 160. Tunnel 170 may be established using any suitable tunneling protocol. For example, a Virtual Private Network (VPN) based on Internet Protocol Security (IPSec) may bridge traffic in a hybrid cloud environment between first site 201 (e.g., on-prem data center) and second site 202 (e.g., public cloud environment). In practice, IPSec is a secure network protocol suite that provides data authentication, integrity and confidentiality between a pair of entities (e.g., data centers, gateways) across an IP-based network. One example in the IPSec protocol suite is Encapsulating Security Payload (ESP), which provides origin authenticity using source authentication, data integrity and confidentiality through encryption protection for IP packets. Another example protocol is Authentication Header (AH) that also ensures source authentication and data integrity. Although various examples will be discussed using IPSec-based VPN, it should be understood that any alternative and/or additional security protocol(s) may be used.

In the example in FIGS. 1 and 2, some example cross-site packet flows are shown. A first packet flow is between VM1 131 on host-A 110A and VM3 133 on host-C 110C. A second packet flow is between VM2 132 on host-B 110B and VM4 134 on host-C 110C. At the first site, EDGE1 150 may perform transmit-side processing by performing encryption and encapsulation on packets originating from source endpoints, such as VM1 131 and VM2 132. At the second site, EDGE2 160 may perform receive-side processing by performing decryption and decapsulation before forwarding decapsulated and decrypted packets towards destination endpoints, such as VM3 133 and VM4 134.

To facilitate cross-site communication, tunnel 170 (known as an IPSec tunnel or VPN channel) may be established using Internet Key Exchange (IKE) or any other protocol. In general, IPSec supports automated generation and negotiation of keys and security associations (SAs)

using the IKE protocol. IKE negotiation includes two phases. Phase one involves EDGE1 150 and EDGE2 160 exchanging proposals for how to authenticate and secure tunnel 170. Once phase one is successful, phase two involves EDGE1 150 and EDGE2 160 negotiating SAs to secure packets that are forwarded via tunnel 170.

Conventionally, using traditional VPN framework as an example, VPN endpoints (e.g., EDGE1 150 and EDGE2 160) are authenticated during IKE channel setup in order to form user plane tunnels (e.g., IPSec SAs) based on 5-tuple information (e.g., source/destination IP address, source/destination port number and protocol) as traffic selector. When sending packets between distributed software systems in a VPN subsystem, it is common to rely on the network to determine the identity of the sender, and to ensure that packets are only received by intended recipients without being seen or modified by a malicious party. Further, conventionally, security policies are static and defined using 5-tuple information. In this case, whenever a packet matches to a SA based its 5-tuple information, the packet will be allowed to be forwarded from EDGE1 150 to EDGE2 160. When a security policy changes, the SA is renegotiated.

With zero trust and software-defined perimeter (SDP), conventional approaches that involve authentication only at the VPN endpoints may not fit well to offer secure segmentation of the network. In practice, simply securing connections between two endpoints is generally not enough. For complex distributed applications that may span multiple networks sharing various services deployed by different networks, it may be undesirable to merely rely on the VPN endpoints to protect their communication.

Flow-Based Secure Packet Forwarding

According to examples of the present disclosure, flow-based secure packet forwarding may be implemented to improve network security in SDN environment 100. Unlike conventional approaches, examples of the present disclosure may be implemented to facilitate secure forwarding of trusted (e.g., authenticated and/or authorized) packet flows over tunnel 170 instead of merely relying on authentication at VPN endpoints (e.g., EDGE1 150 and EDGE2 160) during the IKE channel setup. This way, more secure segmentation of security policies may be implemented in SDN environment 100 to reduce the likelihood of malicious attacks.

Examples of the present disclosure may be performed by any suitable "first computer system" configured to generate encapsulated encrypted packets. In the following, an example pair of "first computer system" and "second computer system" will be explained using EDGE1 150 and EDGE2 160, respectively, to facilitate cross-site communication. In practice, examples of the present disclosure may be implemented using any suitable pair of computer systems, including but not limited to EDGEs. Also, it should be understood that EDGE2 160 acting as a "first computer system" may perform flow-based secure packet forwarding to forward authenticated/authorized traffic flows from second site 202 towards first site 201. In this case, EDGE1 150 may act as a "second computer system" to forward decapsulated and decrypted packets towards their destination.

Figure 3:
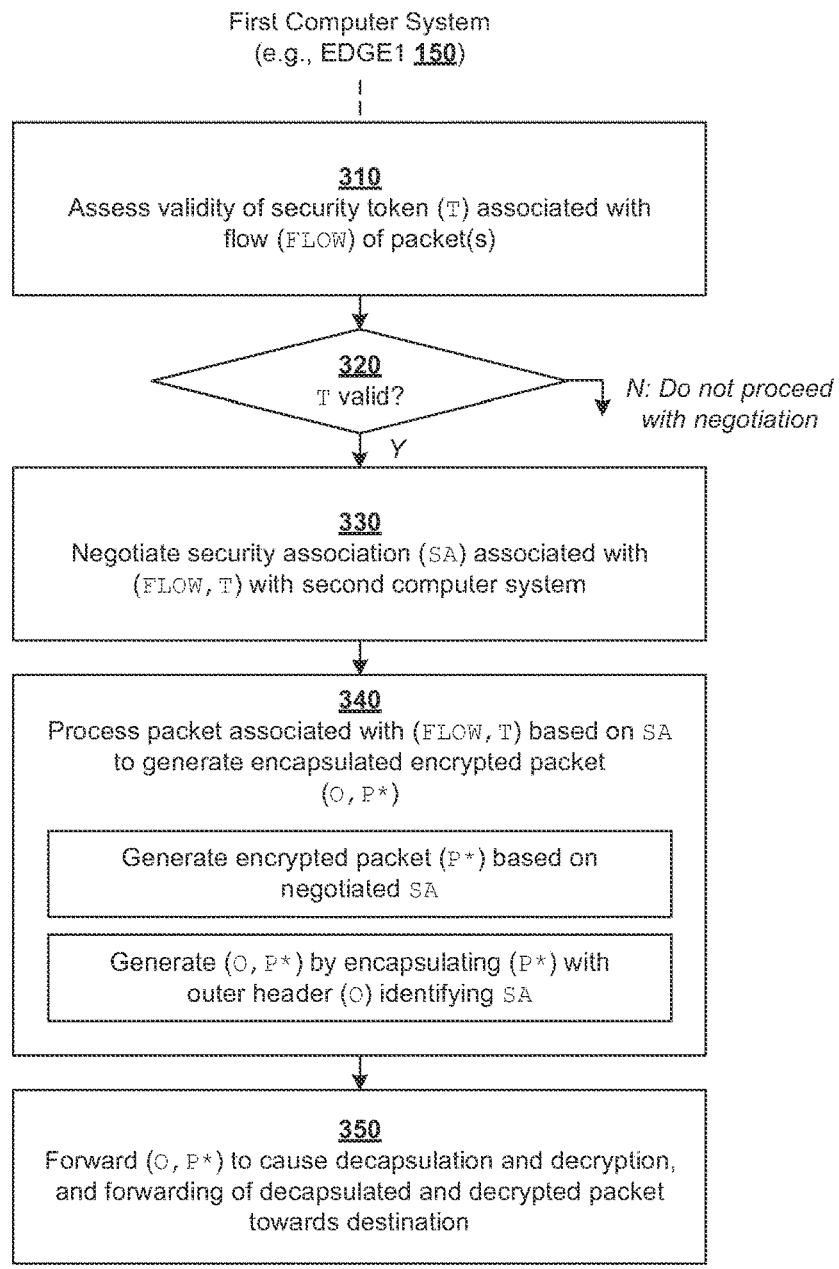
FIG. 3 is a flowchart of an example process for a first computer system to perform flow-based secure packet forwarding.

In more detail, FIG. 3 is a flowchart of example process 300 for a computer system to perform flow-based secure packet forwarding. Example process 300 may include one or more operations, functions, or actions illustrated by one or more blocks, such as 310 to 350. The various blocks may be combined into fewer blocks, divided into additional blocks, and/or eliminated depending on the desired implementation. Throughout the present disclosure, an asterisk (*) is used to indicate encrypted packet content (e.g., P1* and P2*). The absence of the asterisk (e.g., P1 and P2) indicates decrypted or cleartext packet content.

At 310 in FIG. 3, EDGE1 150 may assess validity of a security token associated with a flow of packet(s) that is destined for a destination reachable from EDGE1 150 via EDGE2 160. At 320-330, in response to determination that the security token is valid, EDGE1 150 may negotiate an SA associated with the flow and security token with EDGE2 160. At 340, EDGE1 150 may process a packet associated with the flow and security token to generate an encapsulated encrypted packet by performing encryption and encapsulation based on the SA. The encapsulated encrypted packet may include (a) the packet in an encrypted form, and (b) an outer header identifying the SA negotiated at block 330. At 350, the encapsulated encrypted packet may be forwarded towards EDGE2 160 to cause EDGE2 160 to perform decapsulation and decryption, and to forward decapsulated and decrypted packet towards the destination.

As used herein, the term "security token" may refer generally to any suitable information whose validity may be assessed to determine whether an associated flow of packet(s) is trusted (e.g., authenticated and/or authorized). The term "security association" (i.e., SA) may refer generally to a set of security attribute(s) that are configured for protecting information exchange between a pair of computer systems. For example, each SA may specify security attributes such as cryptographic algorithm(s), encryption/decryption key(s), authentication algorithm(s), etc. Each SA may be associated with a security parameter index (SPI). Each SA may represent a (narrower) flow-based tunnel within tunnel 170 between EDGE1 150 and EDGE2 160.

In a first example, consider a first packet flow (denoted as FLOW1) from source=VM1 131 to destination=VM3 133 in FIGS. 1-2. Here, EDGE1 150 may assess validity of a first security token (denoted as T1) associated with FLOW1. In response to determination that T1=valid (e.g., indicating that FLOW1 is authenticated and/or authorized), EDGE1 150 and EDGE2 160 may negotiate a first SA (denoted as SA1) associated with (FLOW1, T1). To facilitate cross-site communication, EDGE1 150 may process a packet (P1) associated with (FLOW1, T1) by performing encryption and encapsulation based on SA1. This is to generate an encapsulated encrypted packet (O1, P1*), which includes (a) P1*=P1 in an encrypted form, and (b) outer header (O1) identifying SA1 (e.g., SPI=X). The encapsulated encrypted packet (O1, P1*) may then be forwarded via VPN channel 170 towards EDGE2 160 for decapsulation, decryption and subsequent forwarding towards VM3 133. See 180-184 in FIG. 1.

In a second example, consider a second packet flow (denoted as FLOW2) from source=VM2 132 to destination=VM4 134 in FIGS. 1-2. Here, EDGE1 150 may assess validity of a second security token (denoted as T2) associated with FLOW2. In response to determination that T2=valid (e.g., indicating that FLOW2 is authenticated and authorized), EGDE1 150 may negotiate with EDGE2 160 a second SA (denoted as SA2) associated with (FLOW2, T2). To facilitate cross-site communication, EDGE1 150 may process a packet (P2) associated with (FLOW2, T2) by performing encryption and encapsulation based on SA2. This is to generate an encapsulated encrypted packet (O2, P2*) that includes (a) P2*=P2 in an encrypted form, and (b) outer header (O2) identifying SA2 (e.g., SPI=Y). The encapsulated encrypted packet (O2, P2*) is then forwarded via VPN channel 170 towards EDGE2 160 for decapsulation, decryption and forwarding towards VM4 134. See 190-194 in FIG. 1.

Using examples of the present disclosure, dedicated SAs (each representing a flow-based tunnel) may be negotiated for authenticated and/or authorized flows. Depending on the desired implementation, blocks 310-320 may be performed in response to receiving a packet along with a security token and determination that negotiation of the SA is required (e.g., SA not recorded in a security policy database). To assess the validity of the security token, EDGE1 150 may interact with a management entity (e.g., 501 in FIG. 5) to determine whether the associated flow is authenticated and/or authorized. During SA negotiation at block 330, EDGE1 150 may forward the security token towards EDGE2 160 to cause EDGE2 160 to assess validity of the security token itself along with flow information associated with the flow. By assessing whether the security token is valid at both tunnel endpoints (e.g., VPN endpoints), network security may be further strengthened.

Depending on the desired implementation, each security token may be associated with an expiry time. For example, on expiry of security token=T1, EDGE1 150 may remove SA1 associated with (FLOW1, T1). Similarly, on expiry of security token=T2, EDGE1 150 may remove SA2 associated with (FLOW2, T2). In practice, any suitable granularity of flows may be implemented. For example, each security token may be allocated to a service, which may be implemented by a VM, a process/application/microservice running on the VM, etc. Examples of the present disclosure may be implemented to facilitate authenticated service based on encrypted traffic flows. In another example, hybrid cloud/federated environment may be implemented to have secured encrypted authenticated traffic flows across distributed systems. This also provides a zero-trust framework for secured micro-segmentation of security policies. The examples in FIGS. 1-3 will be discussed in detail using FIGS. 4-8.

First Example: SA1 for (FLOW1, T1)

Figure 4:
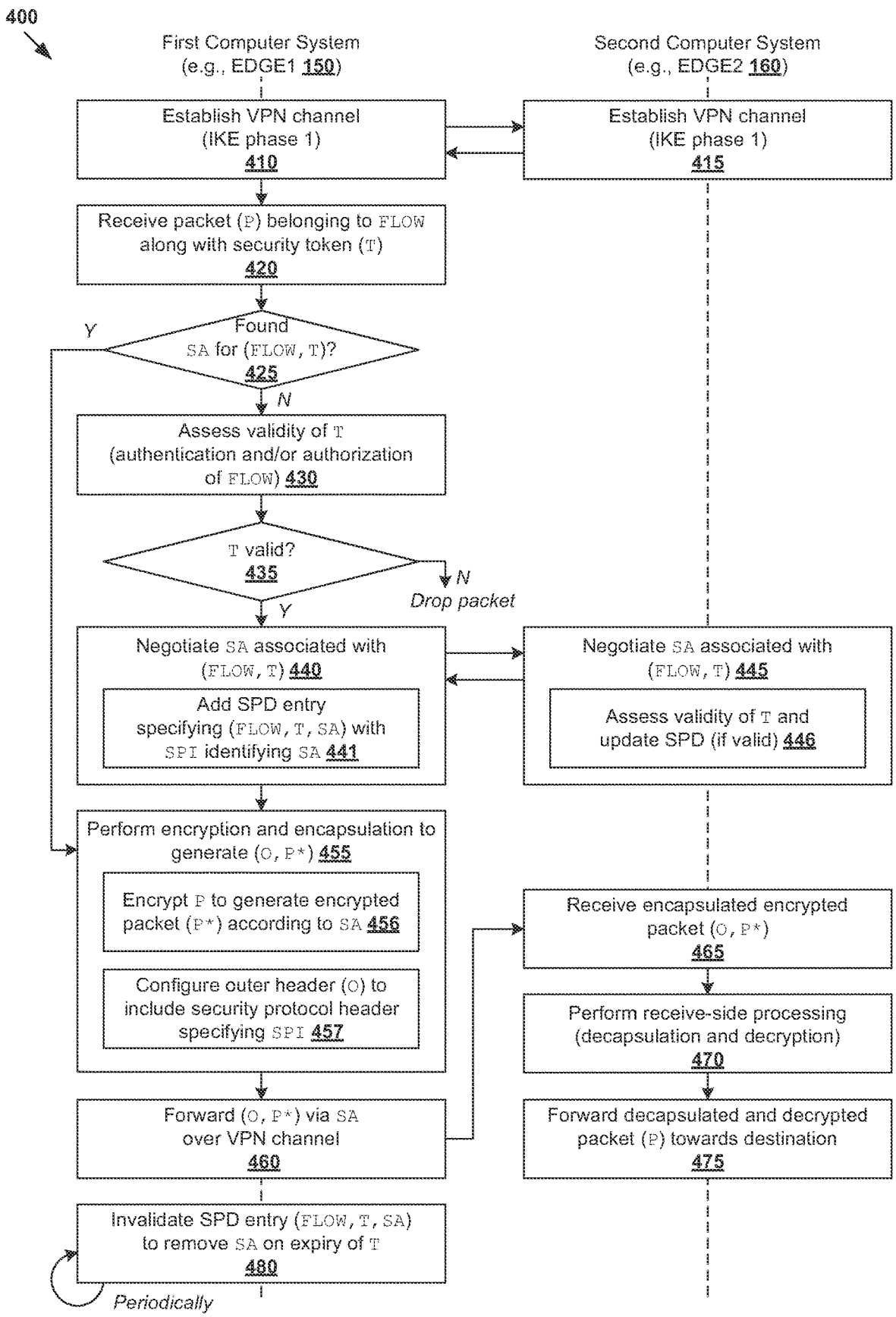
FIG. 4 is a flowchart of an example detailed process for a first computer system to perform flow-based secure packet forwarding.

FIG. 4 is a flowchart of example detailed process 400 for a first computer system to perform flow-based secure packet forwarding. Example process 400 may include one or more operations, functions, or actions illustrated by one or more blocks, such as 410 to 480. The various blocks may be combined into fewer blocks, divided into additional blocks, and/or eliminated depending on the desired implementation. The example in FIG. 4 will be explained using FIG. 5, which is a schematic diagram illustrating example flow-based secure packet forwarding 500 that involves negotiating a first SA associated with a first flow and first security token.

In the following, examples of the present disclosure will now be explained using IPSec-based VPN. It should be understood that any alternative and/or additional protocol(s) may be used. The following notations will be used below: SIP=source IP address, DIP=destination IP address, SPN=source port number, DPN=destination port number, PRO=protocol, OUTER_SIP=outer source IP address associated with a first EDGE (e.g., EDGE1 150) in an outer header, OUTER_DIP=outer destination IP address associated with a second EDGE (e.g., EDGE2 160) in the outer header, etc.

(a) VPN Channel Establishment

Figure 5:
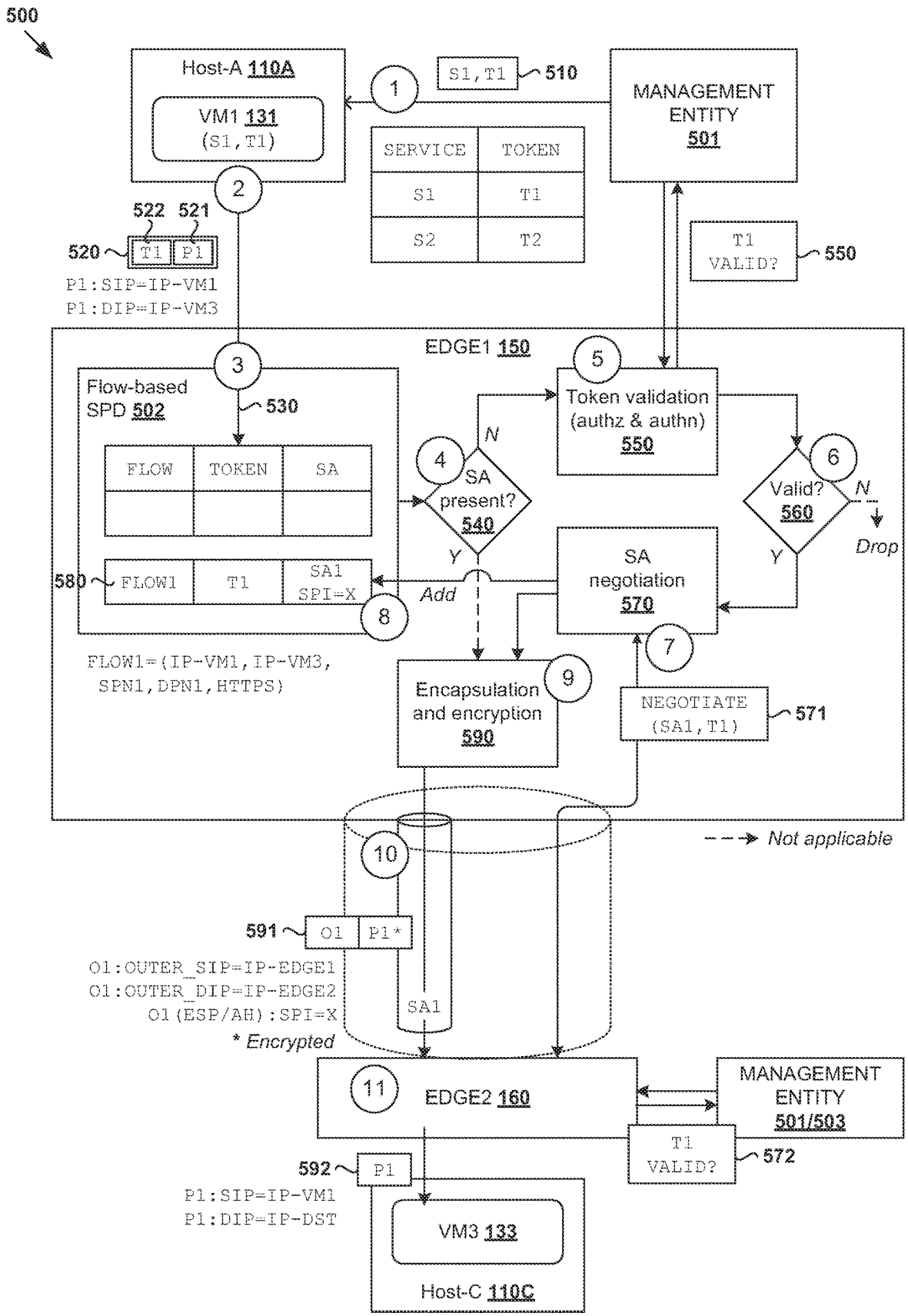
FIG. 5 is a schematic diagram illustrating example flow-based secure packet forwarding that involves negotiating a first security association (SA) associated with a first flow and a first security token.

In the example in FIG. 5, tunnel 170 in the form of a secure VPN channel may be established between EDGE1 150 and EDGE2 160 (i.e. VPN endpoints) according to blocks 410-415 in FIG. 4. Any suitable protocol may be used, such as IKE, etc. In general, IKE is an IPSec-based tunneling protocol that provides a secure VPN communication channel between peers and defines negotiation and authentication for IPSec SAs in a protected manner. During IKE phase 1, IKE SAs are negotiated to set up a secure channel, which may be used for negotiating various IPSec SAs in IKE phase 2 (to be discussed below).

In practice, the purpose of IKE phase 1 is to authenticate IPSec peers (i.e., EDGE1 150 and EDGE2 160; also known as VPN endpoints) are authenticated and set up a secure channel between them to enable IKE exchanges and subsequent SA negotiation in IKE phase 2 below. During IKE phase 1, EDGE1 150 and EDGE2 160 may negotiate an IKE SA policy to protect the IKE exchange, and perform authenticated key exchange (e.g., Diffie-Hellman approach). Depending on the desired implementation, IKE phase 1 may be performed in two modes: main mode (using a three-way exchange) and aggressive mode (fewer exchanges than the main mode).

(b) Security Token

At 510 in FIG. 5, management entity 501 (i.e., trusted domain) may allocate different tokens to different services implemented in SDN environment 100, such as a first security token (T1) to a first service (S1) implemented by VM1 131, second security token (T2) to a second service (S2) implemented by VM2 132, etc. Any suitable security token generation mechanism may be implemented, (a) Secure Protection Identity Framework for Everyone (SPIFFE), an open-standard authorization protocol (OAuth) for generating access or refresh tokens, Kerberos service tickets, etc. In general, SPIFFE is a set of open-source specifications for a framework capable of bootstrapping and issuing identity to services. Example implementation details for token allocation are described in corresponding United States Patent Application Publication No. 2021/0036890, which is incorporated herein by reference.

Using SPIFFE for example, each security token may include an SPIFFE Verifiable Identity Documents (SVID), which is a document that includes an SPIFFE ID representing the identity of an associated service implemented by VM 131/132. It encodes the SPIFFE ID in a cryptographically-verifiable document in any suitable format, such as X.509 certificate, JavaScript Object Notation (JSON) web token (JWT) token, etc. For example, an X.509-SVID may include an SPIFFE ID (i.e., its identity), a private key tied to the ID for signing data on behalf of a workload, and a set of certificates (also known as a trust bundle) for verifying an X.509-SVID presented by another workload. A JWT-SVID may include an SPIFFE ID (i.e., its identity), a JWT token and a set of certificates to verify the identity of another workload. In some cases, X.509-SVIDs may be used to reduce the likelihood of replay attacks, in which an attacker that obtains the token in transit can use it to impersonate a workload.

As used herein, a "service" to which a security token is allocated may represent an application implemented by a VM, a submodule of the application, the VM itself, a container running inside the VM, etc. In general, the term "service" may encompass a range of different definitions of a software system, including a web server running a web application on a cluster of VMs with a load balancer for load distribution; an instance of a database, a collection of independently deployed systems that work together (e.g., a web application that uses a database service), etc. In other words, the granularity of a service may be defined to include a physical or virtual node (e.g., VM); a process, application or microservice running on that node, and a collection of nodes. Similarly, any suitable granularity of a flow may be used.

(c) Tokenized Packet Flow

At 520 in FIG. 5, VM1 131 on host-A 110A may send first packet (P1) 521 along with first security token (T1) 522 towards EDGE1 150. P1 521 may be associated with a first flow denoted as FLOW1 with flow or 5-tuple information (SIP=IP-VM1, DIP=IP-VM3, SPN=SPN1, DPN=DPN1 and PRO=HTTPS). Here, SIP=IP-VM1 is associated with source=VM1 131 supported by host-A 110A at first site 201. DIP=IP-VM3 is associated with destination=VM3 133 supported by host-C 110C at second site 202, which is reachable from EDGE1 150 via EDGE2 160. In practice, P1 521 may be sent along with T1 522 in any suitable form, such as a tokenized or encapsulated packet that includes both P1 521 and T1 522.

In one embodiment described in corresponding United States Patent Application Publication No. 2021/0036890 (mentioned above), a security token may be inserted in an option field of an encapsulation header (e.g., GENEVE header). For example, VM1 131 may generate an encapsulated packet that includes P1 521, and T1 522 in an outer encapsulation header. In practice, note that a VNIC associated with VM1 131 may remove the encapsulation header and add the security token to metadata associated with FLOW1 that is maintained by hypervisor-A 112A. This way, a virtual tunnel endpoint (VTEP) supported by hypervisor-A 112A may add T1 522 to the outer encapsulation header of T1 522 based on the metadata before sending it to EDGE1 150 for further processing. Any alternative approach for sending a packet along with a security token may be implemented.

(d) SA1 Negotiation

At 530 in FIG. 5, in response to receiving P1 521 along with T1 522, EDGE1 150 may perform a lookup in security policy database (SPD) 502 based on flow information associated with P1 521, and T1 522. Any suitable flow information may be extracted from P1 521, such as 5-tuple information (SIP=IP-VM1, DIP=IP-VM3, SPN=SPN1, DPN=DPN1 and PRO=HTTPS). See also blocks 420-425 in FIG. 4.

At 540 in FIG. 5, since an SA associated with (FLOW1, T1) is not found in SPD 502, EDGE1 150 may determine that SA negotiation is required. In this case, at 550, EDGE1 150 may assess the validity of T1 522 to determine whether FLOW1 is authenticated and/or authorized. For example, this may involve EDGE1 150 generating and sending a request to any suitable management entity 501 capable of assessing the validity of T1 522. Based on a reply from management entity 501, EDGE1 150 may determine whether T1 522 is valid. See also blocks 425-430 in FIG. 4.

At 560 and 570 in FIG. 5, in response to determination that T1 522 is valid, EDGE1 150 may negotiate a first SA (i.e., SA1) with EDGE2 160 according to IKE phase 2. A valid token indicates that a flow is trusted (e.g., authenticated and/or authorized), in which case the SA negotiation may proceed. Otherwise, P1 521 may be dropped. During SA negotiation, T1 522 along with 5-tuple information associated with FLOW1 may be used as labeled traffic selector(s) in order to restrict the type of packets allowed to be sent over SA1 to those with valid T1 522. Implementation details relating to labeled traffic selector for IKE v2 are described in a working document entitled "Labeled IPSec Traffic Selector support for IKEv2," which is published by the Internet Engineering Task Force (IETF) and incorporated herein by reference. In practice, a new field type may be created to send T1 522 along with the 5-tuple information during SA negotiation. During the initial IKE exchange both endpoints may send vendor ID payload for security label feature negotiation while maintaining backward compatibility such that ESP payload format remains substantially the same. As such, in one implementation, the IPSec SA negotiation exchange process and the way SPD 502 is maintained may be updated. See also blocks 435-440 in FIG. 4.

At 570, 571 and 572 in FIG. 5, during the negotiation of SA1, EDGE1 150 may send T1 522 along with 5-tuple information associated with FLOW1 to EDGE2 160. This is to cause EDGE2 160 to assess the validity of T1 522 along with the 5-tuple information. Similarly, EDGE2 160 may generate and send a request to management entity 501/503 (i.e., same entity used by EDGE1 150 or a different one) capable of performing the assessment. Again, a valid token indicates that a flow is an authenticated and authorized, in which case EDGE2 160 may proceed with the negotiation of SA1 with EDGE1 150. See also blocks 445-446 in FIG. 4.

In practice, each SA may represent a separate (narrower) tunnel within VPN channel 170. Each SA may specify a set of security attributes, such as cryptographic algorithms, authentication algorithms and encryption/decryption keys. For example, EDGE1 150 and EDGE2 160 may negotiate which algorithm(s) to use for encryption/decryption and data integrity check, such as advanced encryption standard (AES), secure hash algorithm (SHA), AES Galois/Counter mode (AES-GCM), etc. The SA may be established manually (e.g., static tunnel attributes) or dynamically (e.g., tunnel attributes negotiated in real time). Different SAs may have different security attributes to satisfy different needs. Using IPSec, an SA may be uniquely identifiable using an SPI, source and destination address information, and a security protocol such as ESP and AH.

At 580 in FIG. 5, once SA1 is negotiated, EDGE1 150 may update SPD 502 to add a first entry specifying (a) FLOW1=(SIP=IP-VM1, DIP=IP-VM3, SPN=SPN1, DPN=DPN1 and PRO=HTTPS), (b) T1 522, (c) SPI=X and a set of security attributes (i.e., security policy) associated with SA1. Based on the entry, cryptography processing may be performed on packets associated with (FLOW1, T1) for forwarding via SA1. See block 441 in FIG. 4.

(d) Encryption and Encapsulation

At 590 in FIG. 5, EDGE1 150 may process P1 521 associated with (FLOW1, T1) by performing encryption and encapsulation to generate and forward encapsulated encrypted packet 591 towards EDGE2 160. Depending on the desired implementation, it is not necessary to send T1 522 along with encapsulated encrypted packet 591 towards EDGE2 160. The presence of a dedicated IPSec tunnel associated with SA1 itself may be used by EDGE2 160 to identify T1 522 and determine that the associated flow is authenticated/authorized. See also blocks 455-457 and 460 in FIG. 4.

For encapsulated encrypted packet 591 denoted as (O1, P1*) in FIG. 5, 01=outer tunnel header specifying OUTER_SIP=IP-EDGE1 associated with source=EDGE1 150 and OUTER_DIP=IP-EDGE2 associated with destination=EDGE2 160. O1 includes a security protocol header (e.g., ESP or AH header) identifying SPI=X associated with SA1. P1* represents an encrypted packet that is generated by encrypting P1 521 according to a set of security attributes negotiated for SA1. In practice, each encapsulated encrypted packet may be padded with encryption-related data, such as ESP trailer data and ESP authentication data.

(e) Decapsulation and Decryption

At the receive-side at EDGE2 160, the reverse is performed. At 591 in FIG. 5, in response to receiving encapsulated encrypted packet 591 with O1 identifying SA1, EDGE2 160 may perform decapsulation and decryption. This is to generate and send decapsulated and decrypted packet (P1) 592 towards destination=VM3 133 on host-C 110C. This completes end-to-end packet forwarding from source=VM1 131 at first site 201 to destination=VM3 133 at second site 202. See blocks 465-470 in FIG. 4.

(f) Subsequent Packets

Figure 6:
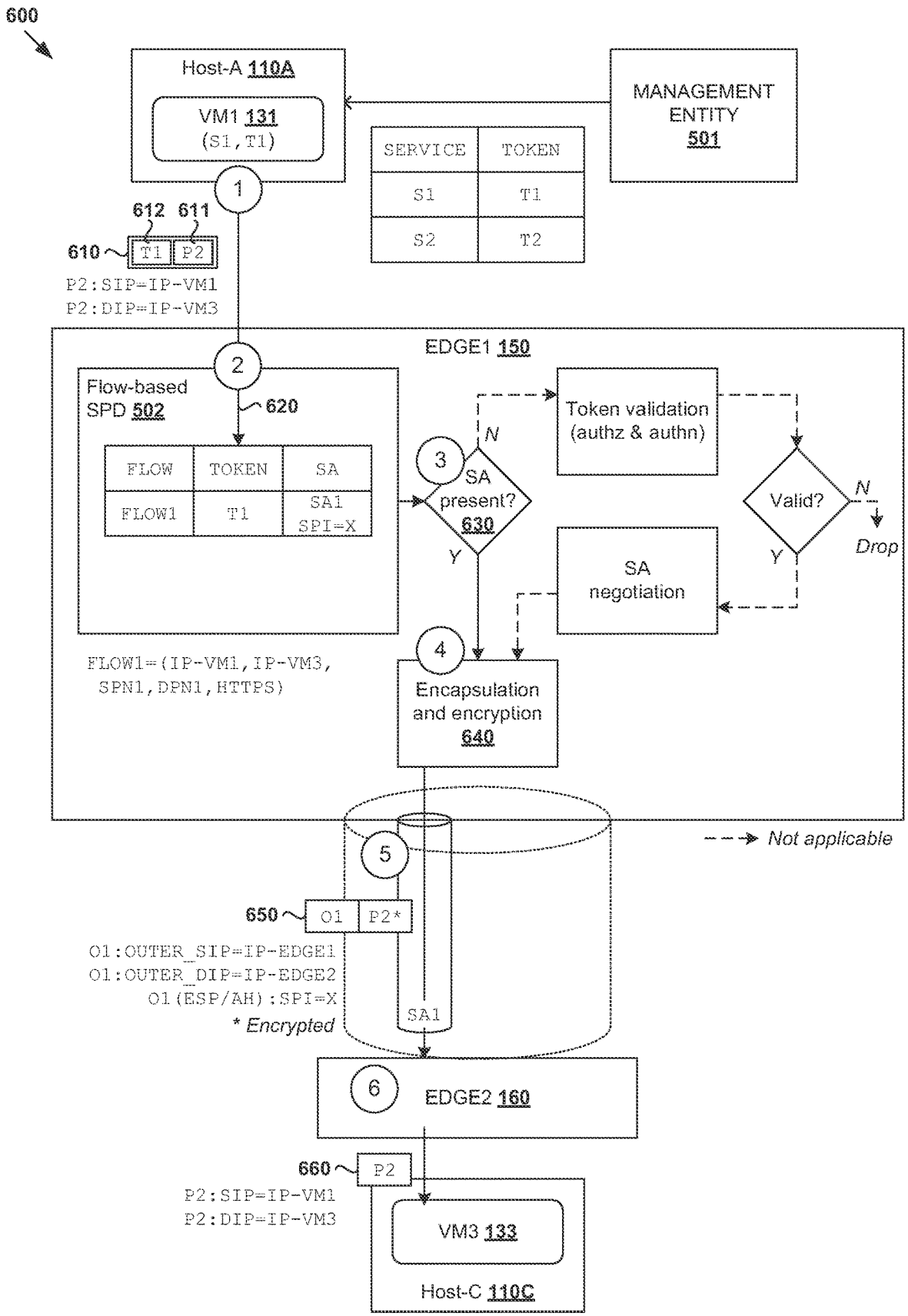
FIG. 6 is a schematic diagram illustrating example flow-based secure packet forwarding using the first SA in FIG. 5.

Once SA1 is negotiated, subsequent packets associated with (FLOW1, T1) may matched to first entry specifying (FLOW1, T1, SA1) in SPD 502. An example is shown in FIG. 6, which is a schematic diagram illustrating example flow-based secure packet forwarding 600 using the first SA in FIG. 5. In particular, at 610-620 in FIG. 6, in response to receiving subsequent packet (P2) 611 belonging to FLOW1 along with T1 612, EDGE1 150 may identify matching SA1 associated with (FLOW1, T1) from flow-based SPD 502.

At 630-640 in FIG. 6, since SA1 is already present, EDGE1 150 may process P2 611 associated with (FLOW1, T1) by performing encryption and encapsulation to generate and forward encapsulated encrypted packet 650 denoted as (O1, P2*) towards EDGE2 160. Similarly, O1 may include a security protocol header (e.g., ESP or AH header) identifying SPI=X associated with SA1. At 660, EDGE2 160 may perform receive-side processing to generate and forward decapsulated and decrypted packet (P2) 660 towards destination=VM3 133 on host-C 110C.

Second Example: SA2 for (FLOW2, T2)

Figure 7:
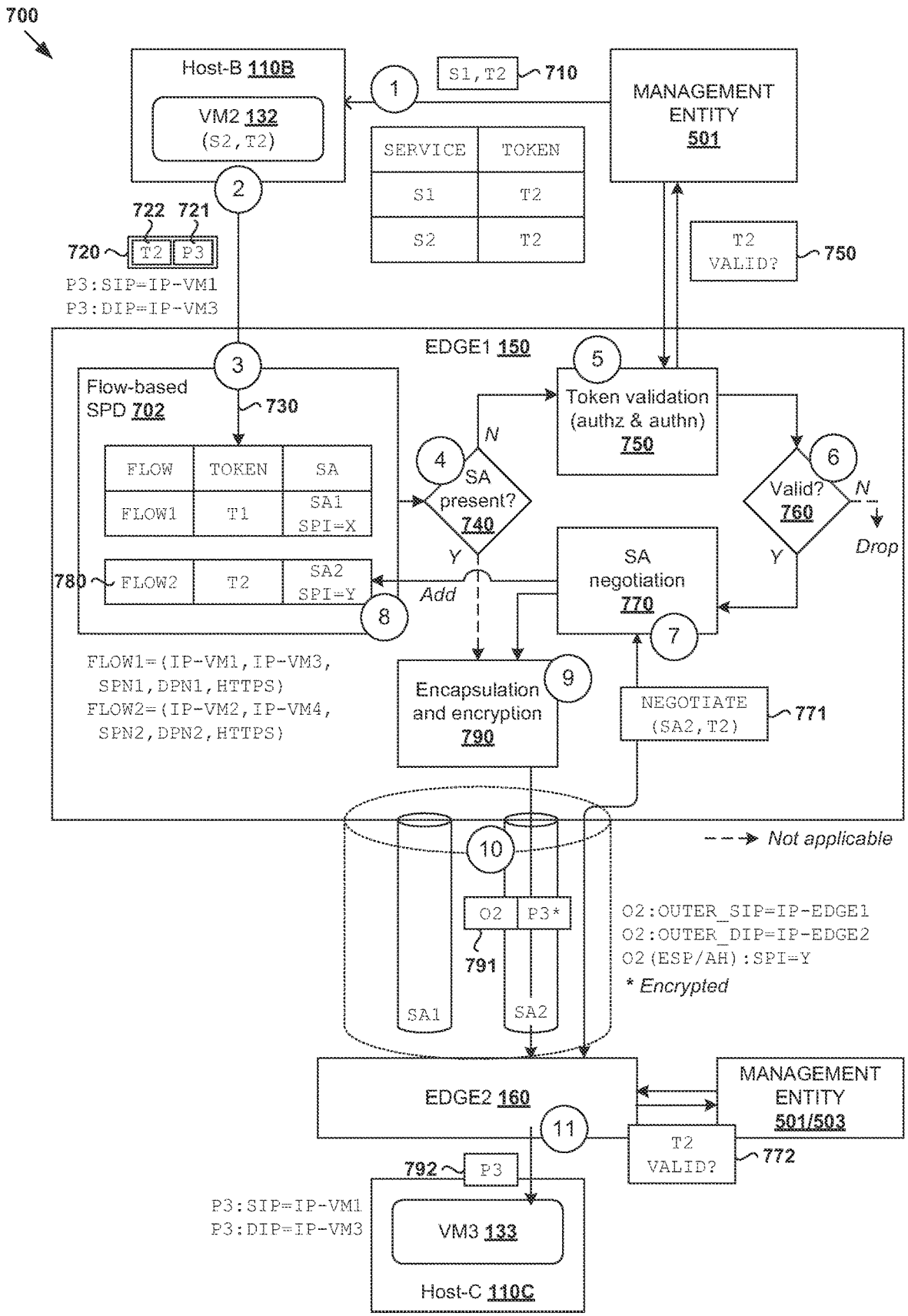
FIG. 7 is a schematic diagram illustrating example flow-based secure packet forwarding that involves negotiating a second SA associated with a second flow and a second security token.
Figure 8:
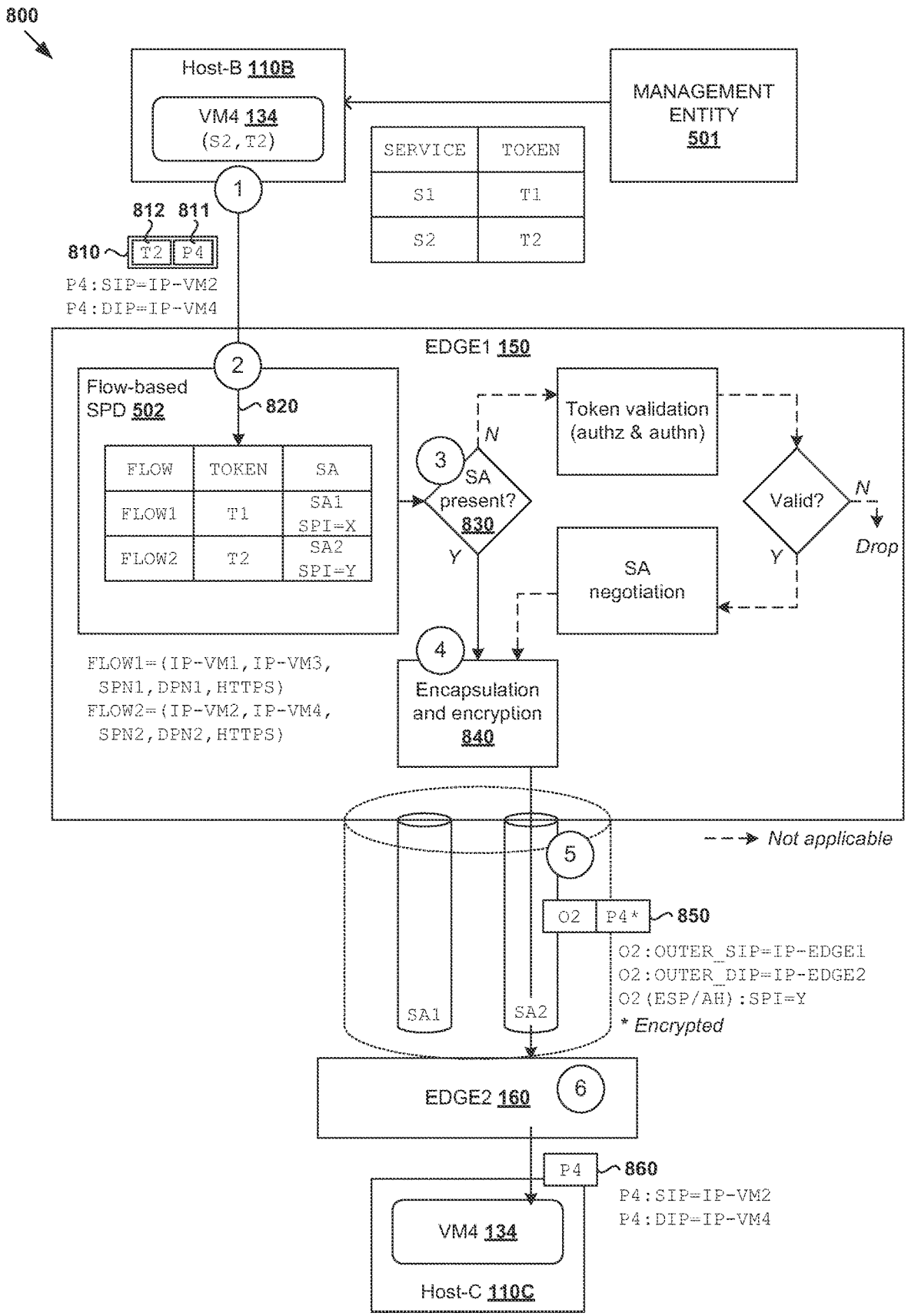
FIG. 8 is a schematic diagram illustrating example flow-based secure packet forwarding using the second SA in FIG. 7.

A second example will be explained using FIG. 7 and FIG. 8. In particular, FIG. 7 is a schematic diagram illustrating example flow-based secure packet forwarding 700 that involves negotiating a second SA associated with a second flow and second security token, and FIG. 8 is a schematic diagram illustrating example flow-based secure packet forwarding 800 using the second SA in FIG. 7. Various implementation details described using FIGS. 5-6 are also applicable here and will not be repeated for brevity.

(a) Tokenized Packet Flow

At 710-720 in FIG. 7, VM2 132 on host-B 110B may send packet (P3) 721 along with security token=T2 722 that is allocated to service=S2 towards EDGE1 150. P3 721 may be associated with FLOW2 with 5-tuple information (SIP=IP-VM2, DIP=IP-VM4, SPN=SPN2, DPN=DPN2 and PRO=HTTPS). Here, SIP=IP-VM2 is associated with source=VM2 132 supported by host-B 110B at first site 201. DIP=IP-VM4 is associated with destination=VM4 134 supported by host-C 110C at second site 202, which is reachable from EDGE1 150 via EDGE2 160. P3 721 may be sent along with T2 722 in any suitable form, such as a tokenized or encapsulated packet (see 720) that includes both P3 721 and T2 722.

(b) SA2 Negotiation

At 730 in FIG. 7, in response to receiving P3 721 along with T2 722, EDGE1 150 may perform a lookup in SPD 502, such as based on 5-tuple information (SIP=IP-VM2, DIP=IP-VM4, SPN=SPN2, DPN=DPN2 and PRO=HTTPS).

At 740 in FIG. 7, since an SA associated with (FLOW2, T2) is not found in SPD 502, EDGE1 150 may determine that SA negotiation is required. In this case, at 750, EDGE1 150 may assess the validity of T2 722 to determine whether FLOW2 is authenticated and/or authorized. For example, this may involve EDGE1 150 generating and sending a request to management entity 501.

At 760 in FIG. 7, in response to determination that T2 722 is valid, EDGE1 150 may negotiate a second SA (i.e., SA2) with EDGE2 160 according to IKE phase 2. Otherwise, P3 721 may be dropped. During SA negotiation, T2 722 may be used as a labeled traffic selector in order to restrict the type of packets allowed to be sent over SA2 to those with valid T2 722.

At 770, 771 and 772 in FIG. 7, during the negotiation of SA2, EDGE1 150 may send T2 722 along with 5-tuple information associated with FLOW2 in traffic selector payload to EDGE2 160 (discussions relating to blocks 560-570 are also applicable here). This is to cause EDGE2 160 to assess the validity of T2 722 along with the 5-tuple information. Similarly, EDGE2 160 may generate and send a request to management entity 501/503 (i.e., same entity used by EDGE1 150 or a different one) capable of performing the assessment. Again, a valid token indicates that a flow is an authenticated and authorized, in which case EDGE2 160 may proceed with the negotiation of SA2.

At 780 in FIG. 7, once SA2 is negotiated, EDGE1 150 may update SPD 502 to add a second entry specifying (a) FLOW2=(SIP=IP-VM2, DIP=IP-VM4, SPN=SPN2, DPN=DPN2 and PRO=HTTPS), (b) T2 722, (c) SPI=Y and a set of security attributes (i.e., security policy) associated with SA2. Based on the entry, cryptography processing may be performed on packets associated with (FLOW2, T2).

(c) Encryption and Encapsulation

At 790 in FIG. 7, EDGE1 150 may process P3 721 associated with (FLOW2, T2) by performing encryption and encapsulation to generate and forward encapsulated encrypted packet 791 towards EDGE2 160. Depending on the desired implementation, it is not necessary to send T2 722 along with encapsulated encrypted packet 791 towards EDGE2 160. The presence of a dedicated IPSec tunnel associated with SA2 itself may be used by EDGE2 160 to identify T2 722 and determine that the associated flow is authenticated/authorized.

For encapsulated encrypted packet 791 denoted as (O2, P3*) in FIG. 7, O2=outer tunnel header specifying OUTER_SIP=IP-EDGE1 associated with source=EDGE1 150 and OUTER_DIP=IP-EDGE2 associated with destination=EDGE2 160. O2 includes a security protocol header (e.g., ESP or AH header) identifying SPI=Y associated with SA2. Here, P3* represents P3 721 in an encrypted form according to a set of security attributes negotiated for SA2.

(d) Decapsulation and Decryption

At 791 in FIG. 7, in response to receiving encapsulated encrypted packet 791 with O2 identifying SA2, EDGE2 160 may perform decapsulation and decryption. This is to generate and send decapsulated and decrypted packet (P3) 792 towards destination=VM4 134 on host-C 110C. This completes end-to-end packet forwarding from source=VM2 132 at first site 201 to destination=VM4 134 at second site 202.

(e) Subsequent Packets

Once SA2 is negotiated, subsequent packets associated with (FLOW2, T2) may matched to second entry specifying (FLOW2, T2, SA2) in SPD 502. An example is shown in FIG. 8, which is a schematic diagram illustrating example flow-based secure packet forwarding 800 using the second SA in FIG. 7. In particular, at 810-820 in FIG. 8, in response to receiving subsequent packet (P4) 811 belonging to FLOW2 along with T2 812, EDGE1 150 may identify matching SA2 associated with (FLOW2, T2) from flow-based SPD 502.

At 830-840 in FIG. 8, since SA2 is already present, EDGE1 150 may process P4 811 associated with (FLOW2, T2) by performing encryption and encapsulation to generate and forward encapsulated encrypted packet 850 denoted as (O2, P4*) towards EDGE2 160. Similarly, O2 may include a security protocol header (e.g., ESP or AH header) identifying SPI=Y associated with SA2. At 860, EDGE2 160 may perform receive-side processing to generate and forward decapsulated and decrypted packet (P4) 860 towards destination=VM4 134 on host-C 110C.

Using examples of the present disclosure, dedicated SAs that are each associated with (FLOW, security token) may be negotiated to facilitate flow-based IPSec security. This way, only trusted (i.e., authenticated and/or authorized) packet flows are allowed to be forwarded over VPN channel 170. Otherwise, packets will be dropped, such as due to token validation failure at an initiator (e.g., EDGE1 150) and IPSec SA negotiation failure at a responder (e.g., EDGE2 160).

Token Expiration

According to examples of the present disclosure, IPSec SA lifetime may be tied with security token validity. For example, at 480 in FIG. 4, in response to determination that a security token has expired, flow-based SPD 502 may be updated to invalidate an entry identifying an SA associated with the security token, thereby removing the SA. This will in turn delete the SA gracefully at both EDGE1 150 and EDGE2 160. Depending on the desired implementation, block 480 in FIG. 4 may be performed periodically, etc. By allowing only trusted (i.e., authenticated and/or authorized) traffic flows with respective valid security tokens, cross-site communication may be implemented in a more secure and service-aware manner. This should be contrasted against conventional approaches that rely only on the authentication/authorization of VPN endpoints (instead of each packet flow).

Granularity of Security Policies

For multiple flows associated with the same service and token, multiple SAs or a single SA may be negotiated between EDGE1 150 and EDGE2 160 depending on the desired granularity of security policies. For example, consider a scenario where (service=S1, security token=T1) is associated with multiple flows, including FLOW1 (shown in FIGS. 5-6) and FLOW3 (not shown for simplicity).

(a) Multiple SAs for Multiple Flows

In one example, multiple SAs may be negotiated for respective (FLOW1, T1) and (FLOW3, T1). In addition to the examples in FIGS. 5-6, EDGE1 150 may negotiate another SA (e.g., SA3 with SPI=Z) with EDGE2 160 in response to receiving a packet belonging to FLOW3 along with security token=T1. In this case, flow-based SPD 502 may be updated with a new entry specifying (FLOW3, T1, SA3). A similar entry may be added to an SPD maintained by EDGE2 160. Here, once security token=T1 expires, both SA1 and SA3 may be deleted by invalidating respective entries (FLOW1, T1, SA1) and (FLOW3, T1, SA3) in SPD 502. Note that SA1 and SA3 may have the same, or different, cipher properties, such as encryption or hash-based message authentication code (HMAC) algorithm, etc. Since multiple SAs are negotiated, more IKE/IPSec control signaling is generally required, such as for child SA creation, IPSec rekeys, etc. However, the implementation of multiple SAs may improve performance as traffic associated with multiple SAs may be handled by multiple cores (if available).

(b) Single SA for Multiple Flows

Alternatively, both FLOW1 and FLOW3 may utilize the same SA1. In this case, during SA negotiation, multiple traffic selectors may be used to specify multiple flows (i.e., FLOW1 and FLOW3) associated with SA1. Note that SA1 may be negotiated in response to detecting P1 521 belonging to FLOW1 along with T1 522 as explained using the example in FIG. 5. However, in response to detecting a subsequent packet belonging to FLOW3 along with the same security token=T1, the existing SA1 may be deleted, and renegotiated for both FLOW1 and FLOW3 in the traffic selectors. Once security token=T1 expires, SA1 associated with both flows will be deleted.

Container Implementation

Although discussed using VMs 131-136, it should be understood that flow-based secure packet forwarding may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 231, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as EDGE 150/160 may be deployed in SDN environment 100 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method, comprising:
    assessing, by a first edge device in a software-defined network (SDN) and in response to receiving a security token associated with a flow of one or more packets along with a packet associated with the flow, validity of the security token, wherein the flow originates from a source device served by the first edge device and is destined for a destination device that is reachable from the first edge device via a second edge device;
    in response to a determination that the security token is valid, negotiating, by the first edge device, a security association with the second edge device, wherein the security association is associated with the flow and the security token;
    processing, by the first edge device, the packet associated with the flow and the security token to generate an encapsulated encrypted packet by performing encryption and encapsulation based on the security association, wherein the encapsulated encrypted packet includes (a) the packet in an encrypted form, and (b) an outer header identifying the security association; and
    forwarding, by the first edge device, the encapsulated encrypted packet towards the second edge device to cause the second edge device to perform decapsulation and decryption, and to forward a decapsulated and decrypted packet towards the destination device.

2. The method of claim 1, wherein assessing validity of the security token comprises:
    assessing the validity of the security token in response to receiving the packet along with the security token and determination that negotiation of the security association is required.

3. The method of claim 2, wherein assessing validity of the security token comprises:
    receiving the packet along with the security token from a virtualized computing instance implementing a service, wherein the security token is allocated to the service by a security token generation mechanism selected from: (a) Secure Production Identity Framework for Everyone (SPIFFE) Verifiable Identity Document (SVID), (b) an open-standard authorization protocol (OAuth), and (c) a Kerberos service ticket.

4. The method of claim 1, wherein assessing validity of the security token comprises:
    assessing validity of the security token by interacting with a management entity to determine whether the flow associated with the security token is authenticated or authorized, or both.

5. The method of claim 1, wherein negotiating the security association comprises:
    forwarding the security token towards the second edge device to cause the second edge device to assess validity of the security token along with flow information.

6. The method of claim 1, wherein negotiating the security association comprises:
    storing, in a security policy database, an entry identifying (a) the flow, (b) the security token, (c) a security parameter index identifying the security association and (d) a security policy for encryption.

7. The method of claim 1, wherein receiving the security token along with the packet comprises receiving an encapsulated packet that includes the packet and the security token in an outer encapsulation header.

8. A non-transitory computer-readable storage medium that includes a set of instructions which, in response to execution by a processor of a computer system, cause the processor to perform operations comprising:
    assessing, by a first edge device in a software-defined network (SDN) and in response to receiving a security token associated with a flow of one or more packets along with a packet associated with the flow, validity of the security token, wherein the flow originates from a source device served by the first edge device and is destined for a destination device that is reachable from the first edge device via a second edge device;
    in response to a determination that the security token is valid, negotiating, by the first edge device, a security association with the second edge device, wherein the security association is associated with the flow and the security token;
    processing, by the first edge device, the packet associated with the flow and the security token to generate an encapsulated encrypted packet by performing encryption and encapsulation based on the security association, wherein the encapsulated encrypted packet includes (a) the packet in an encrypted form, and (b) an outer header identifying the security association; and
    forwarding, by the first edge device, the encapsulated encrypted packet towards the second edge device to cause the second edge device to perform decapsulation and decryption, and to forward a decapsulated and decrypted packet towards the destination device.

9. The non-transitory computer-readable storage medium of claim 8, wherein assessing validity of the security token comprises:
    assessing the validity of the security token in response to receiving the packet along with the security token and determination that negotiation of the security association is required.

10. The non-transitory computer-readable storage medium of claim 9, wherein assessing validity of the security token comprises:
  receiving the packet along with the security token from a virtualized computing instance implementing a service, wherein the security token is allocated to the service by a security token generation mechanism selected from: (a) Secure Production Identity Framework for Everyone (SPIFFE) Verifiable Identity Document (SVID), (b) an open-standard authorization protocol (OAuth), and (c) a Kerberos service ticket.

11. The non-transitory computer-readable storage medium of claim 8, wherein assessing validity of the security token comprises:
  assessing validity of the security token by interacting with a management entity to determine whether the flow associated with the security token is authenticated or authorized, or both.

12. The non-transitory computer-readable storage medium of claim 8, wherein negotiating the security association comprises:
  forwarding the security token towards the second edge device to cause the second edge device to assess validity of the security token along with flow information.

13. The non-transitory computer-readable storage medium of claim 8, wherein negotiating the security association comprises:
  storing, in a security policy database, an entry identifying (a) the flow, (b) the security token, (c) a security parameter index identifying the security association and (d) a security policy for encryption.

14. The non-transitory computer-readable storage medium of claim 13, the operations further comprising:
  in response to an expiry of the security token, invalidating the entry in the security policy database to remove the security association.

15. A computer system, being a first computer system, comprising:
  a processor; and
  a non-transitory computer-readable medium having stored thereon instructions that, when executed by the processor, cause the processor to perform operations comprising:
    assessing, by a first edge device in a software-defined network (SDN) and in response to receiving a security token associated with a flow of one or more packets along with a packet associated with the flow, validity of the security token, wherein the flow originates from a source device served by the first edge device and is destined for a destination device that is reachable from the first edge device via a second edge device;
    in response to a determination that the security token is valid, negotiating, by the first edge device, a security association with the second edge device, wherein the security association is associated with the flow and the security token;
    processing, by the first edge device the packet associated with the flow and the security token to generate an encapsulated encrypted packet by performing encryption and encapsulation based on the security association, wherein the encapsulated encrypted packet includes (a) the packet in an encrypted form, and (b) an outer header identifying the security association; and
    forwarding, by the first edge device, the encapsulated encrypted packet towards the second edge device to cause the second edge device to perform decapsulation and decryption, and to forward a decapsulated and decrypted packet towards the destination device.

16. The computer system of claim 15, wherein assessing validity of the security token comprises
  assessing the validity of the security token in response to receiving the packet along with the security token and determination that negotiation of the security association is required.

17. The computer system of claim 16, wherein assessing validity of the security token comprises
  receiving the packet along with the security token from a virtualized computing instance implementing a service, wherein the security token is allocated to the service by a security token generation mechanism selected from: (a) Secure Production Identity Framework for Everyone (SPIFFE) Verifiable Identity Document (SVID), (b) an open-standard authorization protocol (OAuth), and (c) a Kerberos service ticket.

18. The computer system of claim 15, wherein assessing validity of the security token comprises:
  assessing validity of the security token by interacting with a management entity to determine whether the flow associated with the security token is authenticated or authorized, or both.

19. The computer system of claim 15, wherein negotiating the security association comprises:
  forwarding the security token towards the second computer system to cause the second computer system to assess validity of the security token along with flow information.

20. The computer system of claim 15, wherein negotiating the security association comprises
  storing, in a security policy database, an entry identifying (a) the flow, (b) the security token, (c) a security parameter index identifying the security association and (d) a security policy for encryption.

21. The computer system of claim 20, the operations further comprising:
  in response to an expiry of the security token, invalidating the entry in the security policy database to remove the security association.

* * * * *